F. LJUNGSTRÖM.
FRICTION GEARING.
APPLICATION FILED JAN. 14, 1920.
1,406,665.
Patented Feb. 14, 1922.
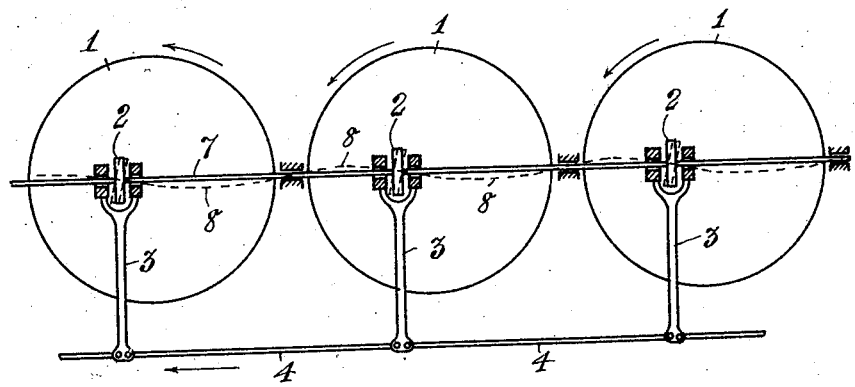
Inventor
F. Ljungström.
By H. R. Kerslake
Atty

UNITED STATES PATENT OFFICE.

FREDRIK LJUNGSTRÖM, OF BREVIK, LIDINGÖN, SWEDEN, ASSIGNOR TO AKTIEBOLAGET LJUNGSTRÖM ANGTURBIN, OF STOCKHOLM, SWEDEN, A CORPORATION.

FRICTION GEARING.

1,406,665.  Specification of Letters Patent.  Patented Feb. 14, 1922.

Application filed January 14, 1920. Serial No. 351,329.

*To all whom it may concern:*

Be it known that I, FREDRIK LJUNGSTRÖM, subject of the King of Sweden, residing at Brevik, Lidingön, Sweden, have invented certain new and useful Improvements in Friction Gearings, of which the following is a specification.

The present invention relates to an arrangement in such adjustable gearings in which the power is transmitted by friction between a rotating member, for instance a rotating disk, and a roller running in contact therewith, the said roller being adapted to be laterally displaced relatively to the rotating member or the rotating disk respectively. The invention has for its purpose to facilitate the displacement of the roller on changing the ratio of gearing.

The invention consists therein that the friction roller is so arranged as to permit of being placed obliquely with respect to the normal axis of rotation thereof, whereby the roller is caused to move toward or from the centre of rotation of the rotating disk, preferably by bending the shaft thereof.

The accompanying drawing illustrates an embodiment of the invention by way of example, the figure showing friction rollers arranged each in contact with one of a number of rotating friction disks in as many friction gearings disposed beside each other.

In the drawing, 1 denotes the rotating disks contacting with the rollers 2 running thereon, said rollers permitting of being placed obliquely with respect to the normal position thereof by moving the forked rods 3 connected with a common pulling rod 4. It will be understood that the oblique position of the friction rollers 2 is attained by bending the roller shaft 7, which is journaled in the shanks of the forked rod 3 in the proximity of the rollers 2, so that it will be bent by the movement of the bearings or in the present case of the forked rods 3. The drawing also clearly discloses the way of simultaneously actuating the rollers 2 by means of the pulling rod 4.

Assuming that a pull be exerted in the rod 4, then the shaft 7 will be bent, as indicated by the dotted line 8, so as to bring the rollers 2 in a position which is oblique relatively to the normal position, the new position being indicated in the drawing by dotted lines. The friction rollers 2, which in the present case drive the rotating disks 1 in the direction of the arrows, will cause the rollers to move toward the centre of rotation through the said bending of the shaft 7, the rollers either sliding on the shaft or bringing it with them.

On bending the shaft 7 reversely, the rollers will be displaced in the opposite direction.

As a much smaller power is required for the adjustment of the friction rollers in an oblique position than for a constrained displacement of the shaft 7, the mechanical arrangements in a gearing according to the present invention will be much smaller and lighter than in a gearing wherein the displacement of the shaft is made use of.

What I claim as new and desire to secure by Letters Patent of the United States is:—

In a friction gearing, the combination of a shaft, any number of rotary friction members placed near the shaft, any number of friction rollers supported by said shaft and adapted to be adjusted and moved in relation to said friction members, and a swingable bearing for the shaft placed near each friction roller, the shaft being so connected with the rollers and the bearings as to be bent into wave shape upon the swinging of the bearings.

In testimony whereof I affix my signature in presence of two witnesses.

FREDRIK LJUNGSTRÖM.

Witnesses:
P. H. BERGROTH,
F. E. HAINES.